(12) United States Patent
Kamiyama

(10) Patent No.: US 10,504,500 B2
(45) Date of Patent: Dec. 10, 2019

(54) VEHICLE WHEEL

(71) Applicant: HONDA MOTOR CO., LTD., Minato-Ku, Tokyo (JP)

(72) Inventor: Yoichi Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 15/558,924

(22) PCT Filed: Mar. 3, 2016

(86) PCT No.: PCT/JP2016/056541
§ 371 (c)(1),
(2) Date: Sep. 15, 2017

(87) PCT Pub. No.: WO2016/147878
PCT Pub. Date: Sep. 22, 2016

(65) Prior Publication Data
US 2018/0082670 A1   Mar. 22, 2018

(30) Foreign Application Priority Data

Mar. 19, 2015 (JP) ................... 2015-055585

(51) Int. Cl.
*G10K 11/172* (2006.01)
*B60B 21/12* (2006.01)
*B60B 21/02* (2006.01)

(52) U.S. Cl.
CPC .......... *G10K 11/172* (2013.01); *B60B 21/023* (2013.01); *B60B 21/026* (2013.01); *B60B 21/12* (2013.01); *B60B 2900/133* (2013.01)

(58) Field of Classification Search
CPC ..... B60B 21/12; B60B 21/023; B60B 21/026; B60B 2900/133; G10K 11/172; B60C 19/002
(Continued)

(56) References Cited

U.S. PATENT DOCUMENTS 6,309,026 B1 * 10/2001 Svedhem ............... B60C 19/00
152/209.2
7,690,410 B2   4/2010 Kamiyama et al.
(Continued)

FOREIGN PATENT DOCUMENTS

CN   104070925 A   10/2014
CN   104175799 A   12/2014
(Continued)

OTHER PUBLICATIONS

Office Action issued in the corresponding Chinese patent application No. 201680016578.3, with the English translation thereof, dated Mar. 5, 2019.

*Primary Examiner* — Jeremy A Luks
(74) *Attorney, Agent, or Firm* — Carrier Blackman & Associates, P.C.; Joseph P. Carrier; William D. Blackman

(57) ABSTRACT

In a vehicle wheel, communication holes of first Helmholtz resonators (auxiliary air chamber members) having a resonant frequency lower by a first prescribed frequency Δfa than the resonant frequency of air column resonance sounds of a tire, and communication holes of second Helmholtz resonators having a resonant frequency higher by a second prescribed frequency Δfb than the resonant frequency of air column resonance sounds of the tire, are arranged facing each other across the wheel rotational center, the second prescribed frequency Δfb being set greater than the first prescribed frequency Δfa.

2 Claims, 11 Drawing Sheets

(58) Field of Classification Search
USPC .......................................................... 181/286
See application file for complete search history.

(56) References Cited

U.S. PATENT DOCUMENTS

| | | | |
|---|---|---|---|
| 7,896,043 B2* | 3/2011 | Kashiwai | ............ B60C 23/0494 |
| | | | 152/381.6 |
| 7,896,044 B2* | 3/2011 | Kashiwai | ................. B60B 3/04 |
| | | | 152/381.6 |
| 8,418,735 B2* | 4/2013 | Kamiyama | ............... B60B 1/08 |
| | | | 152/381.6 |
| 8,490,665 B2* | 7/2013 | Nagata | ...................... B60B 1/06 |
| | | | 152/381.6 |
| 9,694,626 B2* | 7/2017 | Kamiyama | ............. B60B 21/12 |
| 9,701,157 B2* | 7/2017 | Kamiyama | ........... B60C 19/002 |
| 2014/0346843 A1 | 11/2014 | Kamiyama et al. | |
| 2015/0107935 A1 | 4/2015 | Dobrin et al. | |

FOREIGN PATENT DOCUMENTS

| | | | | |
|---|---|---|---|---|
| CN | 204013282 U | 12/2014 | | |
| CN | 204175480 U | 2/2015 | | |
| EP | 2 783 879 A1 | 10/2014 | | |
| JP | 2005-219739 A | 8/2005 | | |
| JP | 2006-341674 A | 12/2006 | | |
| JP | 2008-279873 A | 11/2008 | | |
| JP | 2010-095104 A | 4/2010 | | |
| JP | 2010-095147 A | 4/2010 | | |
| JP | 2011057006 A * | 3/2011 | ........... B60B 21/023 | |
| JP | 2015-081034 A | 4/2015 | | |
| WO | 2015/137370 A1 | 9/2015 | | |

\* cited by examiner

VEHICLE WHEEL

TECHNICAL FIELD

The present invention relates to a vehicle wheel.

BACKGROUND ART

Conventionally, a vehicle wheel is known which includes Helmholtz resonator (additional air chamber member) for reducing air column resonance noise generated in tire air chamber, attached on an outer circumferential surface of a well portion of the wheel (for example, JP 4551422 B). The Helmholtz resonator includes four additional air chambers thereinside disposed equidistantly along a wheel circumferential direction.

A resonance frequency of each of the Helmholtz resonators is set to a resonance frequency of the tire air chamber (resonance frequency of each Helmholtz resonators=resonance frequency of air chamber).

PRIOR ART

Patent Document

PATENT DOCUMENT 1: JP4551422

SUMMARY OF INVENTION

Problem to be Solved by Invention

However, when all the resonance frequencies of four Helmholtz resonators disposed along the wheel circumferential direction are set to the same single frequency, the frequency bands in which the noise can be reduced are limited. Particularly, when a volume of each of the Helmholtz resonators is relatively large, peak levels of "two rebound resonances" generated just after and before an anti-resonance frequency (see FIG. 11 described later) becomes large. Accordingly, there may be a case where the "two rebound resonances" give an acoustic load to crew members in the vehicle cabin.

FIG. 11 is a chart showing noise reduction performance according to related art in which the resonance frequencies of all the Helmholtz resonators are set to a same single frequency.

In FIG. 11, a thin solid line J indicates a case where there is no Helmholtz resonator; a thick broken line L indicates a case where each of the Helmholtz resonators disposed in the wheel has a small volume; and a thick solid line K indicates a case where each of the Helmholtz resonators disposed in the wheel has a large volume. For example, paying attention to the thick solid line K of each of the large capacity Helmholtz resonators, "bouncing resonance" having two peaks is generated at the position just before and after the "anti-resonant frequency" which is the valley portion of the thick solid line K.

The present invention aims to provide a vehicle wheel capable of suppressing rebound resonance.

Means for Solving Problem

An aspect of the present invention provides a vehicle wheel including: Helmholtz resonators including additional air chambers communicating with a tire air chamber through communication through holes, comprising: two pairs of first Helmholtz resonators and second Helmholtz resonators, the first Helmholtz resonator being set to have noise reduction performance for a sound having a resonance frequency lower than the resonance frequency of an air column resonance sound in the tire chamber by a first predetermined frequency, the second Helmholtz resonator being set to have a noise reduction performance for a sound having a resonance frequency higher than the resonance frequency of the air column resonance sound by a second predetermined frequency, wherein the communication through hole of the first Helmholtz resonator and the communication through hole of the second Helmholtz resonator are disposed at positions oppositely facing across a wheel rotation center, and wherein a line connecting the communication through hole of the first Helmholtz resonator and the communication through hole of the second Helmholtz resonator of the one of pairs orthogonally intersects a line connecting the communication through hole of the first Helmholtz resonator and the communication through hole of the second Helmholtz resonator of the another one of pairs.

According to the present invention, setting the second predetermined frequency to be larger than the first predetermined frequency increases the number of the rebound resonances (peak portions) occurring just before and after the anti-resonance frequency at a valley portion from conventionally, two as well as peak levels of the three peak portions are substantially equalized and balanced. According to the present invention, the peak level of the rebound resonance is suppressed, so that the noise reduction performance can be enhanced. As a result, the present invention can preferably avoid application of the acoustic load due to rebound resonance to the crew in the vehicle cabin.

Further, according to the present invention, in the vehicle whee, the first predetermined frequency is $\Delta fa$; and the second predetermined frequency is $\Delta fb$, wherein when it is assumed that air column resonance sound in the tire air chamber is $f_{MC}$, a resonance frequency $f_0$ of the first Helmholtz resonator is set to $f_{MC}-\Delta fa$ [Hz], where $\Delta fa$ is a positive number from 1 to 10 and a resonance frequency f0 of the second Helmholtz resonator is set to $f_{MC}+\Delta fb$ [Hz], where $\Delta fb$ is a positive number from 5 to 20, and the $\Delta fb$ is set to be larger than the $\Delta fa$ ($\Delta fa<\Delta fb$).

According to the present invention, it is easy to enhance the noise reduction performance on the basis of the shift quantity ($\Delta fa$) of the lower limit frequency from the reference frequency and the shift quantity ($\Delta fb$) of the upper limit frequency from the reference frequency.

Advantageous Effect of Invention

The present invention can provide a vehicle wheel capable of suppressing the rebound resonance.

MODES FOR CARRYING OUT INVENTION

Next, an embodiment of the present invention is described below in detail referring to drawings.

Figure 1:
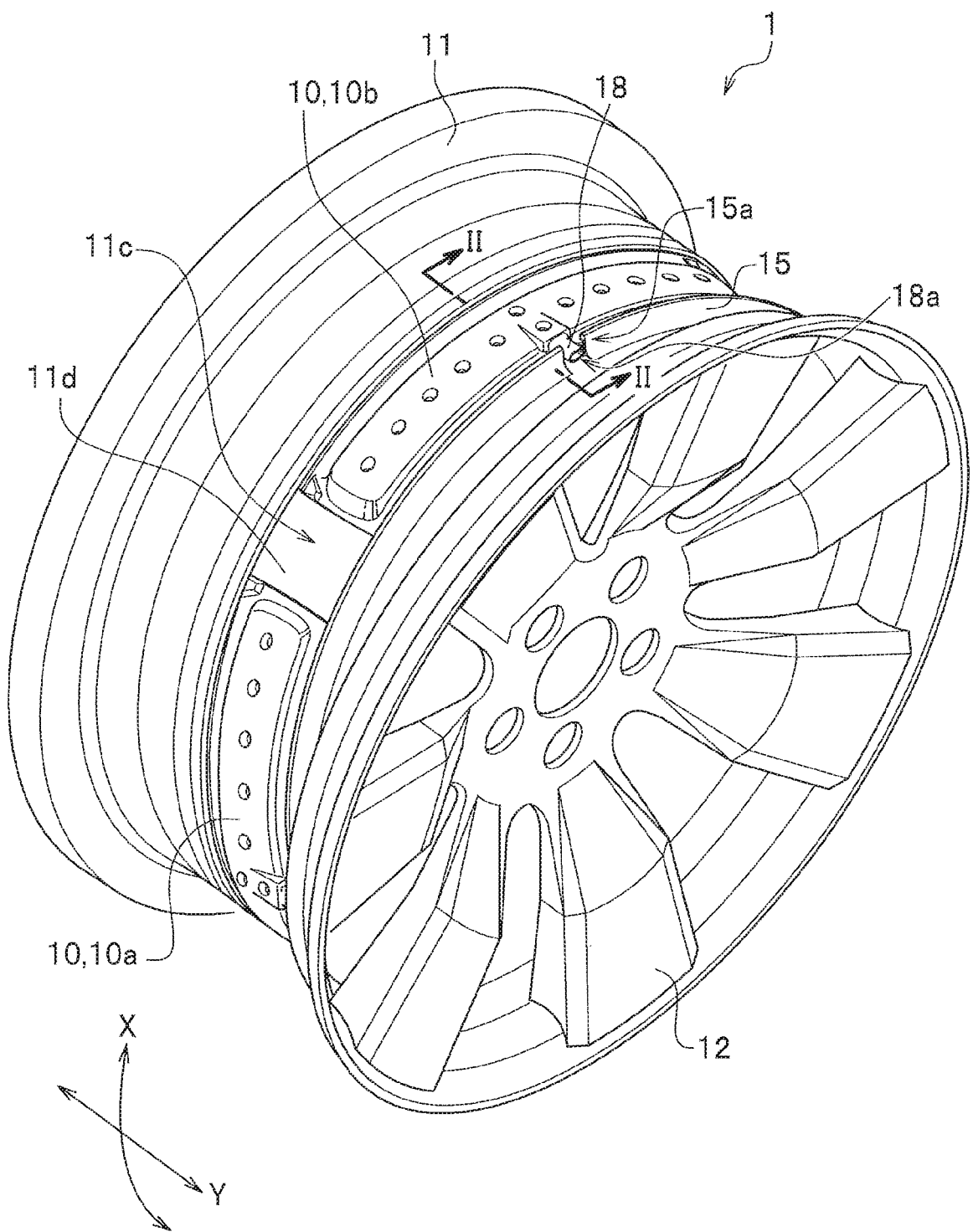
FIG. 1 is a perspective view of a vehicle wheel according to embodiments of the present invention.

FIG. 1 is a perspective view of a vehicle wheel according to an embodiment of the present invention.

As shown in FIG. 1, a vehicle wheel 1 according to the embodiment includes a plurality of additional air chamber members 10 arranged in a wheel circumferential direction X as Helmholtz resonators. In FIG. 1, though only two additional air chamber members 10*a*, 10*b* are shown for convenience of drawing, the vehicle wheel 1 includes four additional air chamber members 10*a*, 10*b*, 10*c*, and 10*d* (see FIG. 4) in the wheel circumferential direction X, as described later in detail. Incidentally, the additional air chamber members 10*a*, 10*d* in the embodiment correspond to "first Helmholtz resonator" and the additional air chamber members 10*b*, 10*c* correspond to "second Helmholtz resonator".

The vehicle wheel 1 according to the embodiment includes two pairs communication through holes 18*a* of the first Helmholtz resonators and the second Helmholtz resonators. Each of the pairs includes a communication through hole 18*a* for the first Helmholtz resonator having a resonance frequency lower than the resonance frequency of air column resonance sound in a tire air chamber MC (see FIG. 2) by a first predetermined frequency (Δfa described later; see FIG. 5) and a communication through hole 18*a* for the second Helmholtz resonator having a resonance frequency higher than the resonance frequency of air column resonance sound in the tire air chamber MC (see FIG. 2) by a second predetermined frequency (Δfb describe later; see FIG. 5). In addition the second predetermined frequency is set to be larger than the first predetermined frequency (Δfa<Δfb described later; see FIG. 5).

The vehicle wheel 1 according to the embodiment mainly features that a line connecting the communication through hole of the first Helmholtz resonator to the communication through hole of the second Helmholtz resonator of one of the pairs intersects a line connecting the communication through hole of the first Helmholtz resonator to the communication through hole of the second Helmholtz resonator of another pair orthogonally each other.

In the below description, when the description is made without distinguishing the additional air chamber members 10*a*, 10*b*, 10*c* each other, they are referred to simply as "additional air chamber member 10".

As shown in FIG. 1, the vehicle wheel 1 according to the embodiment of the present invention includes a limb 11 and a disk 12 connecting the limb 11 to a hub (not shown). In FIG. 1, a reference of "11*d*" denotes an outer circumferential surface of a well portion 11*c*, and the additional air chamber member 10 is fitted into the well portion 11*c* as described in detail later. Further, a reference of "18" denotes a tube in which the communication through hole 18*a* is formed. A reference of "15" denotes a vertical wall having an annular shape standing on an outer circumferential surface 11*d* of the well portion 11*c* extending in a circumferential direction of the limb 11. The additional air chamber member 10 is hooked by a vertical wall 15 as described later. A reference of "15*a*" denotes a notch in the vertical wall 15 into which a tube 18 is fitted when the additional air chamber member 10 is hooked by the vertical wall 15. A reference of "Y" denotes an arrow indicating a wheel width direction.

Figure 2:
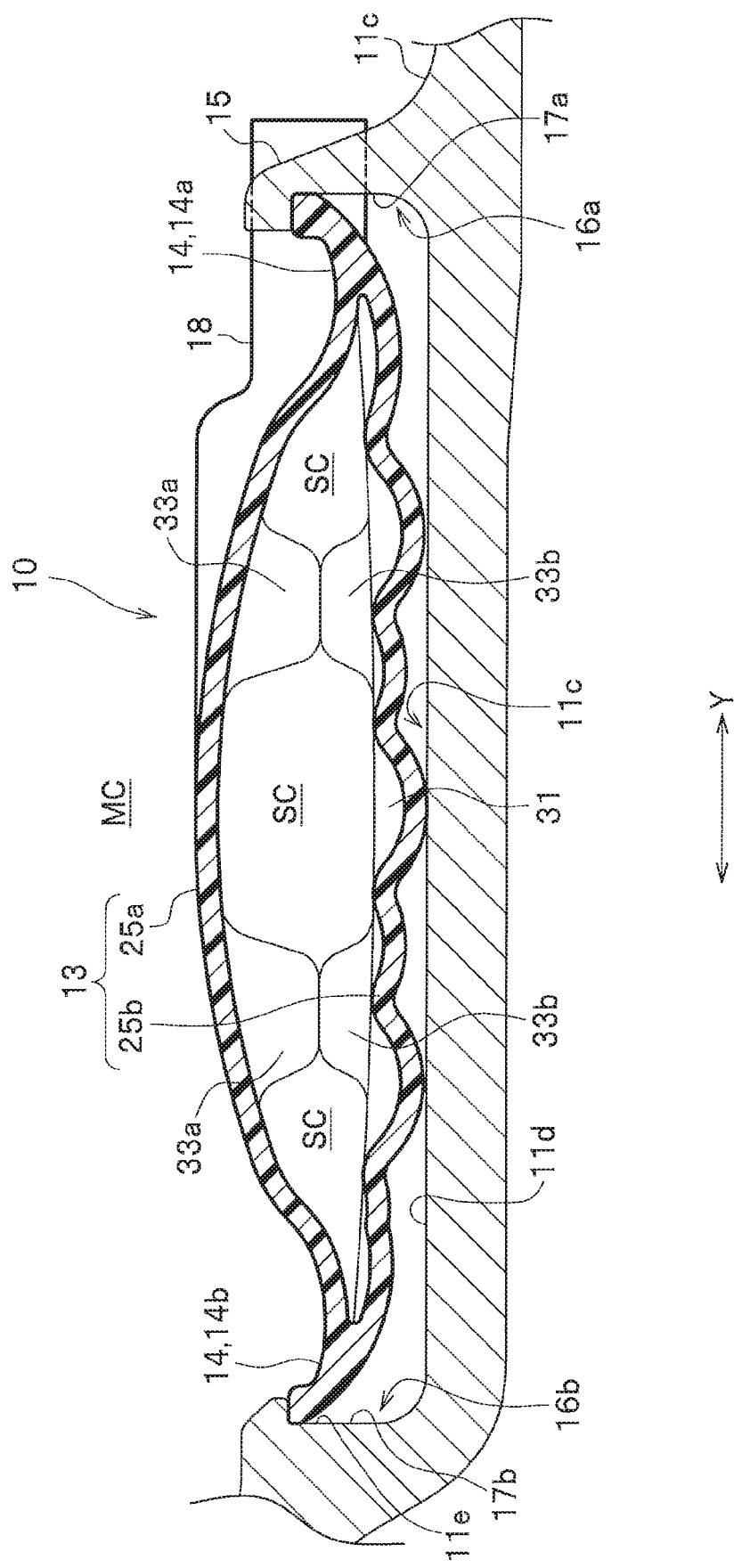
FIG. 2 is an enlarged cross section view taken along line II-II in FIG. 1.

FIG. 2 is an enlarged cross section view taken along line II-II in FIG. 1.

The limb 11 includes, as shown in FIG. 2, the well portion 11*c* which is hollowed inside in a wheel diametrical direction (on a rotation center side) between bead sheet portions (not shown) of the tire formed at both ends in a wheel width direction Y.

The well portion 11*c* is provided to fall the bead portion of the tire when a tire (not shown) is assembled to the limb 11. Incidentally, the well portion 11*c* in the embodiment is formed in a hollow cylindrical shape having the same diameter across the wheel in the wheel width direction.

On the outer circumferential surface 11*d* of the well portion 11*c*, the vertical wall 15 having an annular shape is formed to stand and extend the circumferential direction of the limb 11.

The vertical wall 15 is provided to stand on the outer circumferential surface 11*d* to form a first vertical wall surface 16*a* raising from the outer circumferential surface 11*d* of the well portion 11*c* on an outer side in the wheel diametrical direction.

Further, a side surface portion 11*e* formed inside of the well portion 11*c* in the wheel width direction Y (Left side of the FIG. 2) has a vertical wall surface 16*b* facing the first vertical wall surface 16*a*. The vertical wall 15 in the embodiment is formed integrally the well portion 11*c* when the limb 11 is casted.

In addition, the first vertical wall surface 16*a* and the second vertical wall surface 16*b* are formed to include a channel 17*a* and a channel 17*b*, respectively, when viewed in the wheel diametrical direction. These channels 17*a*, 17*b* are formed along a circumferential direction of the outer circumferential surface 11*d* of the well portion 11*c* to form annular channel. An edge portion 14*a* and an edge portion 14*b* of the additional air chamber 10 are fitted into the channel 17*a* and the channel 17*b* of the additional air chamber member 10, respectively. The channels 17*a*, 17*b* in the embodiment are formed by machining the vertical wall 15 and the side surface portion 11*e*, respectively.

Figure 3:
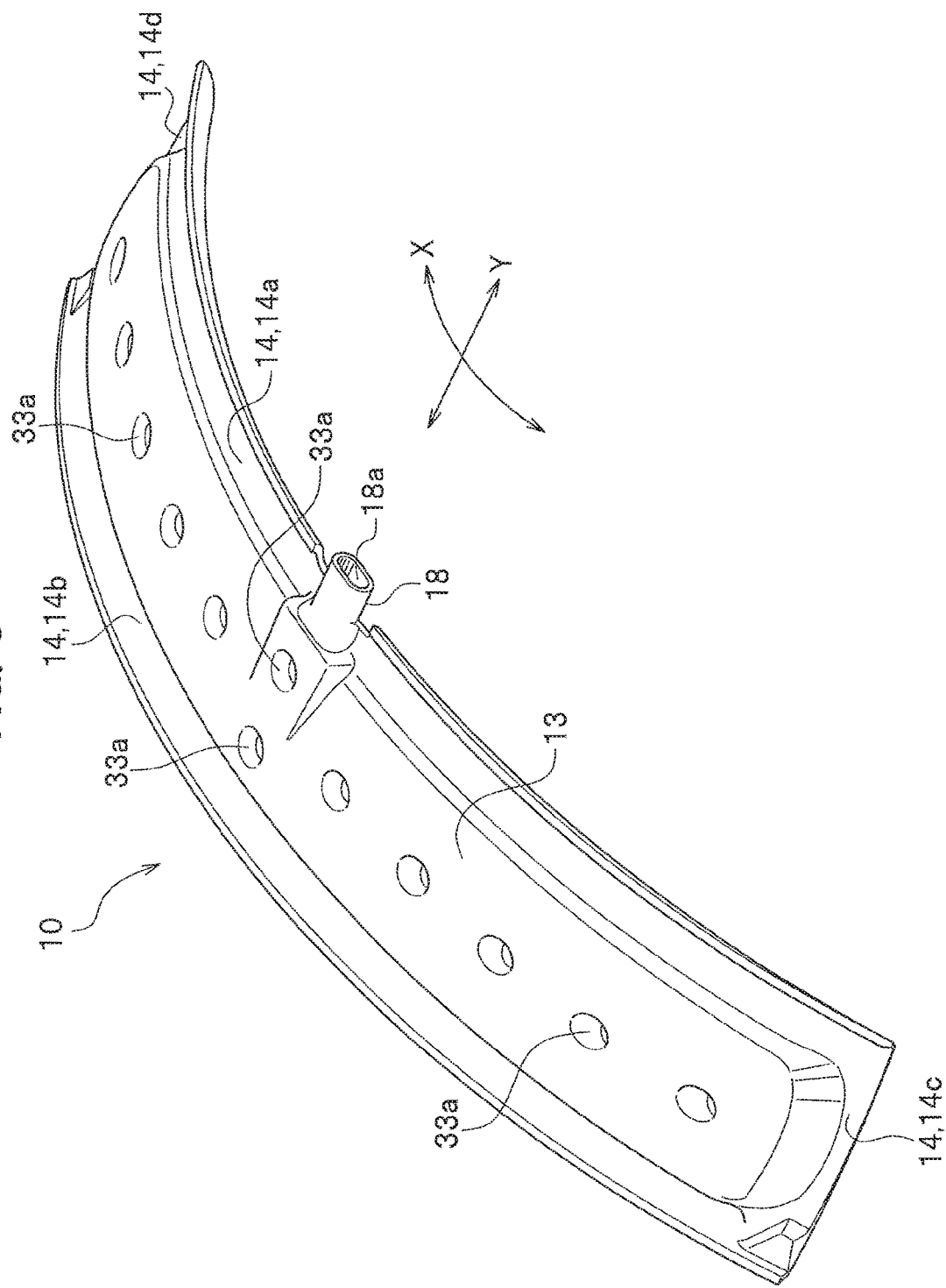
FIG. 3 is an entire perspective view of an additional air chamber member.

FIG. 3 is an entire perspective view of the additional air chamber member 10. In FIG. 3, a reference "X" denotes an arrow indicating the wheel circumferential direction when the additional air chamber member 10 is attached to the well portion 11*c* (see FIG. 1). A reference "Y" denotes an arrow indicating the wheel width direction.

As described above, the vehicle wheel 1 according to the embodiment includes four additional air chamber members 10*a*, 10*b*, 10*c*, 10*d* (see FIG. 4), which have the same structure except that the additional air chamber members 10a, 10d (first Helmholtz resonators) and the additional air chamber member 10b, 10c (second Helmholtz resonators) are set to different resonance frequencies. Accordingly, the additional air chamber members 10a, 10b, 10c, 10d are described below regarding the structure as the additional air chamber member 10.

The additional air chamber member 10 is, as shown in FIG. 3, an elongate member extending in the wheel circumferential direction X and includes a body 13, the tube 18 in which the communication through hole 18a is formed, and an edge portion 14. A longitudinal direction of the additional air chamber member 10 (the wheel circumferential direction X) is curved along the outer circumferential surface 11d (see FIG. 1) of the well portion 11c (see FIG. 1).

Returning to FIG. 2, the body 13 of the additional air chamber member 10 includes a bottom plate 25b and an upper plate 25a which forms together with the bottom plate 25b an additional air chamber SC therebetween. The upper plate 25a and the bottom plate 25b in the embodiment have the same thickness, however, may have thicknesses different each other.

The upper plate 25a is curved to have upward protrusion above the bottom plate 25b disposed along the outer circumferential surface 11d of the well portion 11c to form the additional air chamber SC.

The upper plate 25a includes upper connecting portions 33a formed at a part forming a body 13.

As shown in FIG. 3, ten of the upper connecting portions 33a are formed on a center line of the body 13 in line along the longitudinal direction of the additional air chamber member 10 (the wheel circumferential direction X) and two of the upper connecting portion 33a are formed in line in the short direction (the wheel width direction Y) of the additional air chamber member 10 at the position of the tube 18.

As shown in FIG. 2, bottom-side connecting portions 33b are formed on the bottom plate 25b at positions corresponding to the upper connecting portions 33a.

The bottom-side connecting portions 33b are formed such that the bottom plate 25b is hollowed toward a side of the additional air chamber SC and have circular shape when viewed from the bottom. Tip portions of these bottom-side connecting portions 33b are integrated with tip portions of the upper connecting portions 33a of the upper plate 25a, which connects the upper plate 25a to the bottom plate 25b integrally.

In the present invention, another structure is possible which does not include the upper connecting portion 33a and bottom-side connecting portions.

As shown in FIG. 3, the tube 18 includes the communication through hole 18a thereinside. The tube 18 is formed at a center in the longitudinal direction of the additional air chamber member 10 (the wheel circumferential direction X).

The tube 18 formed as mentioned above, protrudes from the body 13 in the wheel width direction Y.

The communication through hole 18a provides communication between the tire air chamber MC (see FIG. 2) defined by the tire (not shown) on the well portion 11c (see FIG. 2) and the additional air chamber SC (see FIG. 2) to form the Helmholtz resonator together with the additional air chamber SC of the additional air chamber member 10.

A cross section shape of the communication through hole 18a is not specifically limited and has an oval shape in the embodiment (see FIG. 3). However, the cross section shape may be any one of a circle, a polygon, etc.

In addition, an interval of the communication through holes 18a (described later) is defined by center of the openings of the communication through holes 18a.

The tube 18 including the communication through hole 18a is fitted into a notch 15a in the vertical wall 15, which provides a function of stopping rotation of the additional air chamber member 10 in the wheel circumferential direction X (see FIG. 1).

As shown in FIG. 2, the edge portion 14 is formed by connecting the bottom plate 25b and the upper plate 25a.

As shown in FIG. 3, the edge portion 14 is formed with an edge portion 14c and an edge portion 14d extending from the body 13 in the wheel circumferential direction X and the edge portion 14a and the edge portion 14b extending from the body 13 in the direction orthogonal with the wheel circumferential direction X (the wheel width direction Y). In other word, the edge portion 14 (14a, 14b, 14c, 14d) is formed with plate members extending from the body 13 toward circumferential direction to surround the body 13.

As shown in FIG. 2, tip portions of the edge portion 14a and the edge portion 14b extending in the wheel width direction Y are fitted into the channel 17a at the first vertical wall surface 16a and the channel 17b of the second vertical wall surface 16b.

The edge portion 14a and the edge portion 14b extending to the first vertical wall surface 16a and the second vertical wall surface 16b, respectively form a curved surface protruding on a side of the outer circumferential surface 11d of the well portion 11c together with the bottom plate 25b.

A thickness of the edge portion 14 is approximately set to a thickness of the bottom plate 25b and the upper plate 25a. The edge portion 14 has a spring elasticity by appropriately select a material and thickness, etc.

It is assumed that the additional air chamber member 10 formed as described above is made as plastic molding products. However, the material is not limited to this, and the additional air chamber member 10 can be formed with other material such as a metal. In the case of plastic, the material capable of the blow shaping is desirable because of light weight and a high stiffness in consideration of reduction in weight, a high productivity, reduction in manufacturing cost, and a high air-tightness of the additional air chamber SC. Particularly, polypropylene is desirable because polypropylene can withstand repeated bending fatigue.

Next, positions of the additional air chamber members 10 (Helmholtz resonator) of the vehicle wheel 1 in the embodiment is described below.

Figure 4:
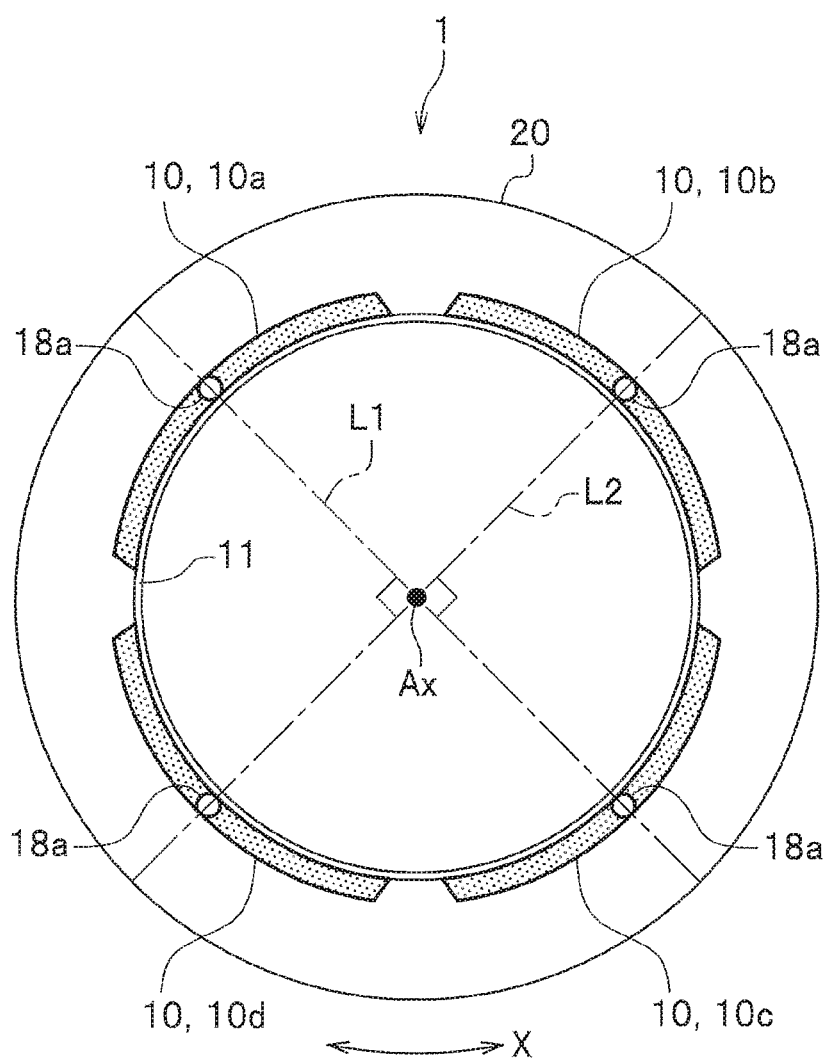
FIG. 4 is a side cross section view schematically showing arrangement positions of the first and second Helmholtz resonators.

FIG. 4 is a side cross section view schematically showing arrangement positions of the additional air chamber members 10a, 10b as the first Helmholtz resonator and the additional air chamber members 10b, 10c as the second Helmholtz resonators. FIG. 4 schematically shows cross sections of the additional air chamber members 10a, 10b, 10c taken along a plane including longitudinal directions of the additional air chamber members 10a, 10b, 10c, 10d and indicates a forming position of the communication through hole 18a with marks of circles.

Figure 5:
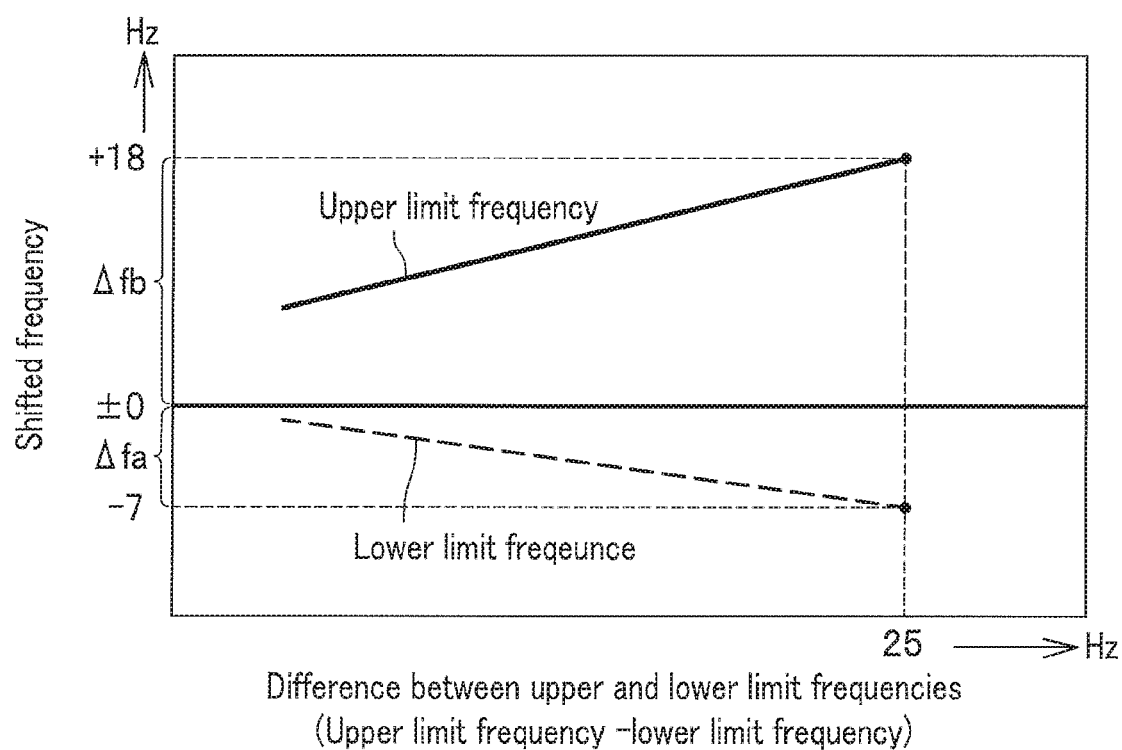
FIG. 5 is a chart showing a relation of a difference between an upper limit frequency and a lower limit frequency to a shifted frequency.

The vehicle wheel 1 has a chamber resonance frequency $f_0$ of the additional air chamber member 10a (first Helmholtz resonator) and a preferred difference from the chamber resonance frequency $f_0$ of the additional air chamber members 10b, 10c (upper limit frequency lower limit frequency (see FIG. 5). Accordingly, the difference corresponds to ($\Delta fa + \Delta fb$) describe later.

The resonance frequency $f_0$ of the additional air chamber members 10a, 10d (first Helmholtz resonators) is set to be lower than an air chamber resonance frequency $f_{MC}$ of an air column resonance sound in the tire air chamber MC by the first predetermined frequency (Δfa). It is preferably set that the difference Δfa (Δfa=$f_0$-$f_{MC}$) is from −1 to −10 [Hz].

The resonance frequency $f_0$ of the additional air chamber members 10b, 10c (second Helmholtz resonator) is set to be higher than the air chamber resonance frequency $f_{MC}$ of the air column resonance sound in the tire air chamber MC by the second predetermined frequency (Δfb). The second predetermined frequency (Δfb) is set to be larger than the first predetermined frequency (Δfa) ((Δfa<Δfb)). Further, the difference Δfb (Δfb=$f_0$-$f_{MC}$) between the resonance frequency $f_0$ and the air chamber resonance frequency $f_{MC}$ is preferably set to 5 to 20 [Hz].

Further, the first predetermined frequency (Δfa) and the second predetermined frequency (Δfb) are preferably set to fulfill a proportional expression of Δfa:Δfb=1:(2.0 to 2.6). In addition, an optimal ratio (Δfb/Δfa) is influenced from the volumes of the Helmholtz resonators.

Incidentally, setting the resonance frequency $f_0$ of the additional air chamber member 10 in accordance with the air chamber resonance frequency $f_{MC}$ of the air column resonance sound of the tire can be made by appropriately adjusting some elements selected from a length (L) of the communication through hole 18a and an opening cross section area of a communication through hole 18a.

$$f_0 = C/2\pi \times \sqrt{(S/V(L+\alpha\times\sqrt{S}))} \qquad \text{Eq. (1)}$$

where $f_0$: a resonance frequency;
C(m/s): a sound velocity in the additional air chamber SC (sound velocity in the tire air chamber MC);
V(m$^3$): a volume of the additional air chamber SC;
L(m): a length of the communication through hole 18a;
S(m$^2$): opening cross section area; and
α: correction efficient.

In the vehicle wheel 1 according to the embodiment, as shown in FIG. 4, the additional air chamber member 10a (first Helmholtz resonator), the additional air chamber member 10b (second Helmholtz resonator), the additional air chamber member 10c (third Helmholtz resonator, and the additional air chamber member 10d (first Helmholtz resonator) are arranged in this order.

The communication through holes 18a of the additional air chamber member 10a and the additional air chamber member 10c forming one of pairs of the first Helmholtz resonators and the second Helmholtz resonators are arranged at positions oppositely facing each other across a rotation center Ax.

Further, the communication through holes 18a of the additional air chamber member 10d and the additional air chamber member 10d forming another one of pairs of the first Helmholtz resonators and the second Helmholtz resonators are arranged at positions facing each other across the rotation center Ax.

In the vehicle wheel 1 according to the embodiment, a line L1 connecting the communication through holes 18a of the additional air chamber member 10a (the first Helmholtz resonators) to the communication through hole 18a of the additional air chamber member 10c (the second Helmholtz resonator) intersects a line L2 connecting the communication through hole 18a of the additional air chamber member 10d and the communication through hole 18a of the additional air chamber member 10b (the second Helmholtz resonators) orthogonally. "Intersect orthogonally" in the embodiment means intersect at 90 degrees including an error (error angle) between the line L1 and the line L2. The error (error angle) is preferably within ±10 degrees.

The vehicle wheel 1 can provide a superior noise reduction performance by reducing a peak level of rebounding resonance as shown in the embodiment described later.

As described above, the embodiment has been described. However, the present invention is not limited to the above described embodiment, and can be modified in various modes.

In the above-described embodiment, it is assumed that the additional air chamber members 10a, 10b, 10c, 10d are used as four different parts. However, some additional air chamber members 10 are selected from the additional air chamber members 10a, 10b, 10c, 10d and combined and assembled integrally, which can be used.

Further, in the above-described embodiment, the Helmholtz resonator is formed with the additional air chamber member 10 attachable to the well portion 11c. However, it is possible to form the limb 11 in which the additional air chamber SC and the tube 18 are directly formed within the limb 11 by providing a cavity.

Further, in the embodiment described above, the communication through hole 18a of the additional air chamber member 10 is formed at the center portion in the longitudinal direction of the additional air chamber member 10. However, the present invention is not limited to this. Accordingly, on the assumption that the line L1 intersects the line L2 orthogonally, there may be such a configuration that the communication through holes 18a are formed at an end portion in the longitudinal direction (wheel circumferential direction X) of the additional air chamber member 10.

Further, the above-described embodiment has been described regarding the case where the communication through holes 18a of the additional air chamber members 10a, 10b, 10c, 10d are arranged with shift to the side of the disk 12 in the wheel width direction Y. However, the position of the communication through hole 18a is not limited to this. Accordingly, the communication through holes 18a of the additional air chamber members 10a, 10b, 10c, 10d may be arranged at any position in the wheel width direction Y. In this case, it is allowed that the line L1 and the L2 intersect orthogonally when viewed in a direction along the wheel rotation axis.

The above-described embodiment shows an example in which the communication through holes 18a are disposed at central portion in the wheel circumferential direction X of the additional air chamber members 10. However, the present invention is not limited to this. The communication through hole 18a may be disposed at other portion. In this case, this is allowed as far as the line L1 and the line 2 intersects orthogonally when viewed in the direction along the wheel rotation axis.

Embodiment

Next, the present invention is described specifically while an embodiment and comparative example are shown.

Embodiment

FIG. 5 is a chart showing a relation between a difference between an upper limit frequency and a lower limit frequency and a shifted frequency. An axis of abscissa in FIG. 5 represents the difference between the upper limit frequency and the lower limit frequency (upper limit frequency−lower limit frequency) respectively set for the additional air chamber member 10b, 10c (second Helmholtz resonator) and the additional air chamber member 10a, 10d (first Helmholtz resonator).

An axis of ordinate of FIG. 5 represents a shift quantity (deviation quantity) from a reference frequency "0" in positive and negative frequencies, respectively, wherein the reference frequency (median, the air chamber resonance frequency $f_{MC}$) when optimal tuning is made for the four Helmholtz resonators including the additional air chamber members 10a, 10b (first Helmholtz resonator) and the additional air chamber members 10b, 10c (second Helmholtz resonator). In this case, "Δfa" (first predetermined frequency) is a shift quantity from the reference frequency of "0" to the lower limit frequency (more negative), and "Δfb" (second predetermined frequency) is a shift quantity from the reference frequency of "0" to the upper limit frequency.

Figure 6:
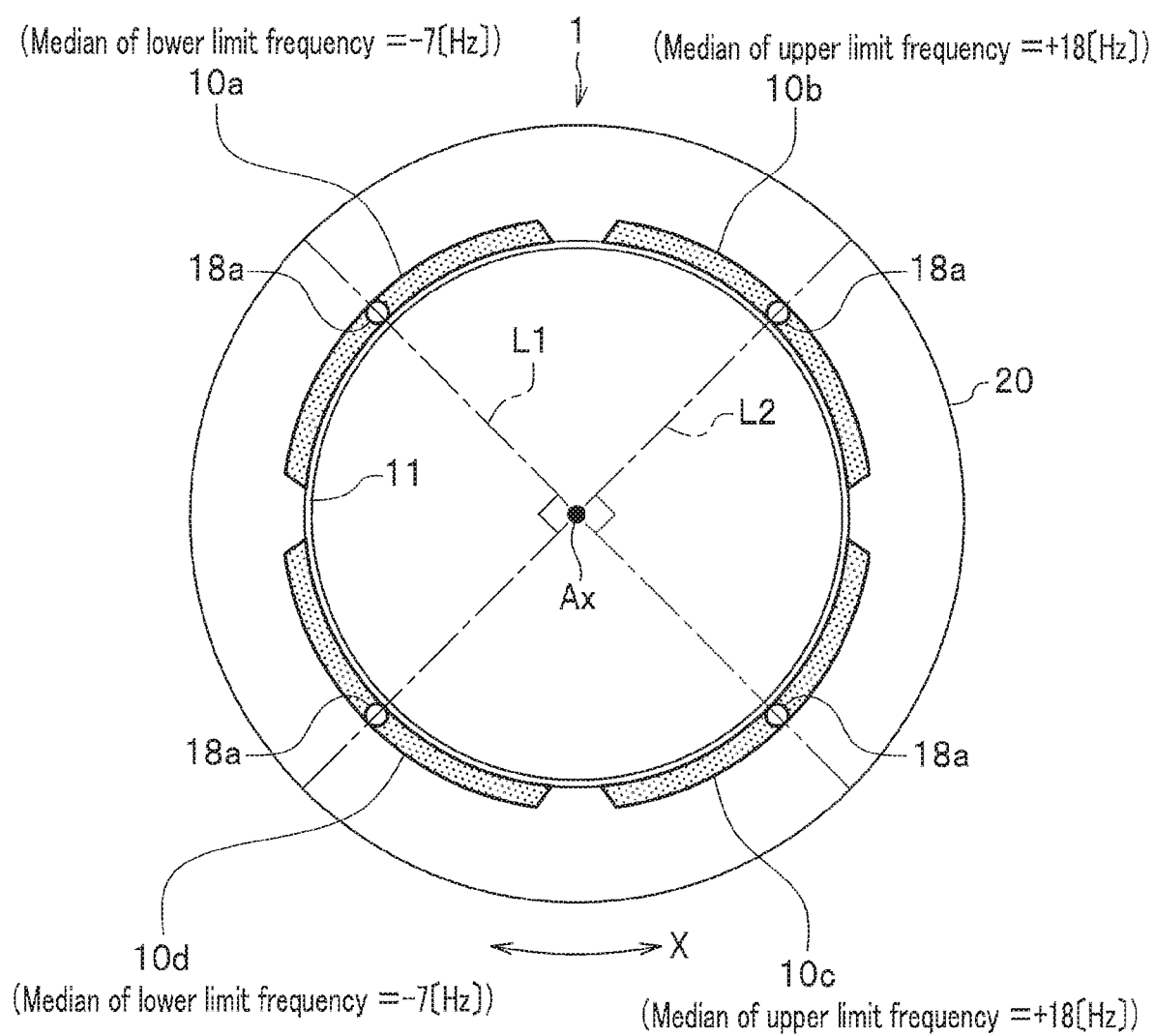
FIG. 6 is a side cross section view schematically showing arrangement position of the first and second Helmholtz resonators in the vehicle wheel according to the embodiment of the present invention.

FIG. 6 is a side cross section view of the additional air chamber member 10a, 10d (the first Helmholtz resonators) and the additional air chamber member 10b, 10c (the second Helmholtz resonators in the vehicle wheel according to this embodiment of the present invention.

Figure 7:
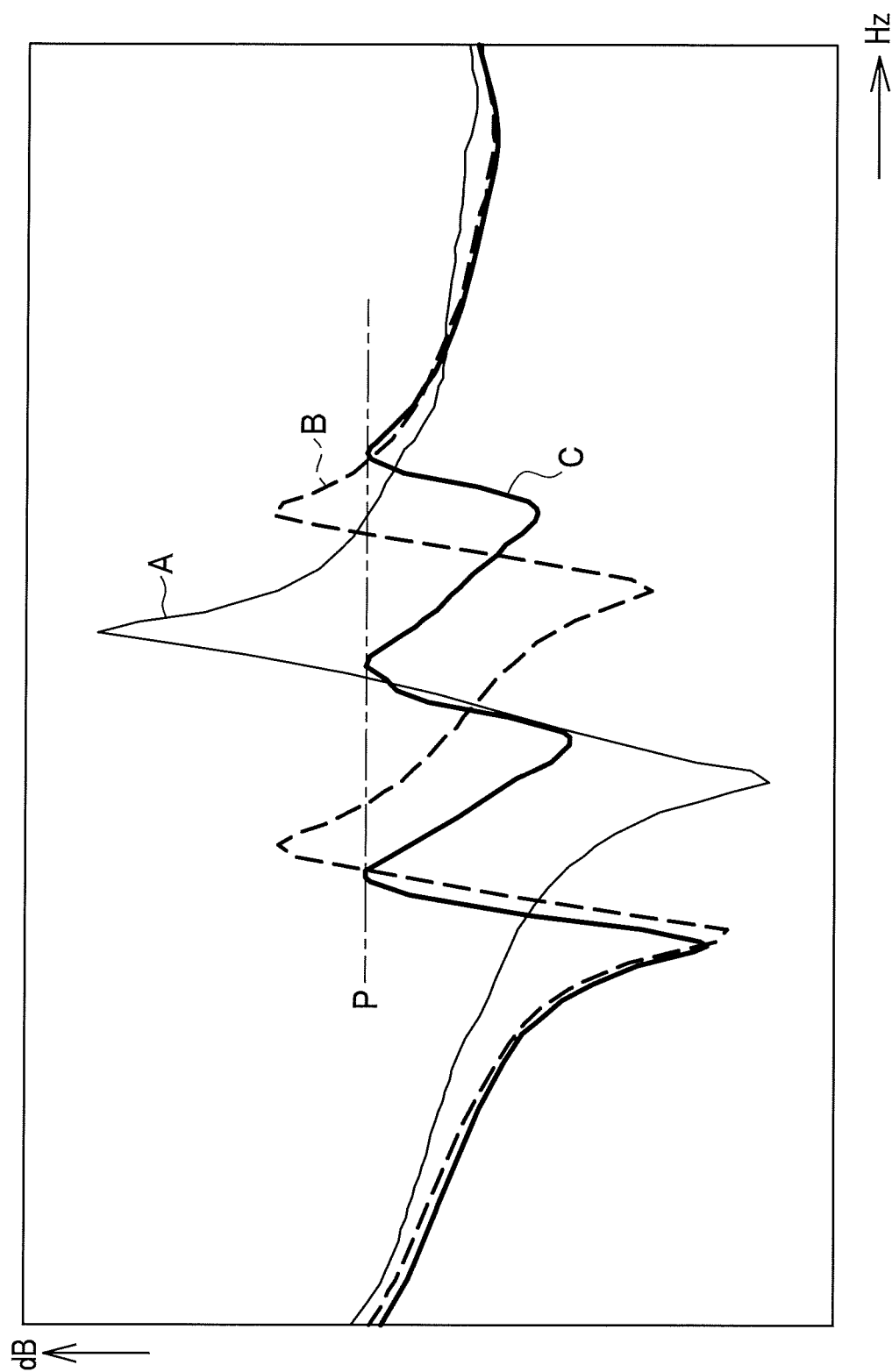
FIG. 7 is a chart showing a noise reduction performance in the vehicle wheel according to the embodiment of the present invention.

FIG. 7 is a chart showing a noise reduction performance in the vehicle wheel according to the embodiment of the present invention.

As shown in FIG. 6, the resonance frequency f0 of the additional air chamber members 10a,10d (first Helmholtz resonator) according to the embodiment is set to be lower than the air chamber resonance frequency $f_{MC}$ in the tire air chamber MC by 7 [Hz] (($f_0-f_{MC}$=-7 [Hz]; Δfa=7).

The resonance frequency f0 of the additional air chamber members 10b,10c (second Helmholtz resonator) according to the embodiment is set to be higher than the air chamber resonance frequency $f_{MC}$ in the tire air chamber MC by 18 [Hz] (($f_0-f_{MC}$=18 [Hz]; Δfb=18).

The vehicle wheel 1 according to the embodiment is set to (Δfb/Δfa=18÷7 □2.6).

A line L1 connecting the communication through hole 18a of the additional air chamber member 10a (the first Helmholtz resonator) and the communication through hole 18a of the additional air chamber member 10c (the second Helmholtz resonator) orthogonally intersect a line connecting the communication through hole 18a of the additional air chamber member 10d (first Helmholtz resonator) and the communication through hole 18a of the additional air chamber member 10b (the second Helmholtz resonator).

In FIG. 6, a reference of "20" designates a tire trade.

Next, a nose reduction performance of the vehicle wheel 1 was estimated.

An impact load is applied by means of hummer blow to a tire tread 20 of the vehicle wheel 1 to which a tire is attached. A magnitude of vibration acceleration was measured at the rotation center Ax of the vehicle wheel. FIG. 7 shows the result.

An axis of ordinate in FIG. 7 represents a magnitude of the vibration acceleration per 1N [(m/s$^2$)/N] when the impact load is applied with conversion in unit of [dB].

An axis of abscissa in FIG. 7 represents a resonance frequency $f_{MC}$ [Hz] of the air column resonance in the tire air chamber MC.

In FIG. 7, a thin solid line A indicates a variation in a case where there is no Helmholtz resonator. A thick broken line B indicates a variation in a case where all resonation frequencies of the Helmholtz resonators disposed in the wheel are set to the same frequency. A thick solid line C indicates a variation in a case of the vehicle wheel 1 shown in FIG. 6. A chain line P indicates a level in which peak levels of three peak portions are equalized and balanced among them.

In the embodiment, as shown by the thick solid line C in FIG. 7, the number of the rebound resonance portions (peak portions) generated just before and after the anti-resonance frequency at a valley portion is increased to three, wherein the number of conventional case was two. In addition, peak levels of three peak portion have been balanced among them by which peak levels are substantially equalized among them. Accordingly, in the embodiment, the peak levels of rebound resonation are suppressed, so that the noise reduction performance has been increased. As a result, in the embodiment, it is possible to suitably prevent the rebound resonance from applying an acrostic load to the crews in the vehicle cabin.

In addition, in the embodiment, depths of the three valleys in the thick solid line C in FIG. 7 are uneven. However, these do not apply the acoustic load to the crew in the vehicle cabin.

Comparative Example 1

Figure 8:
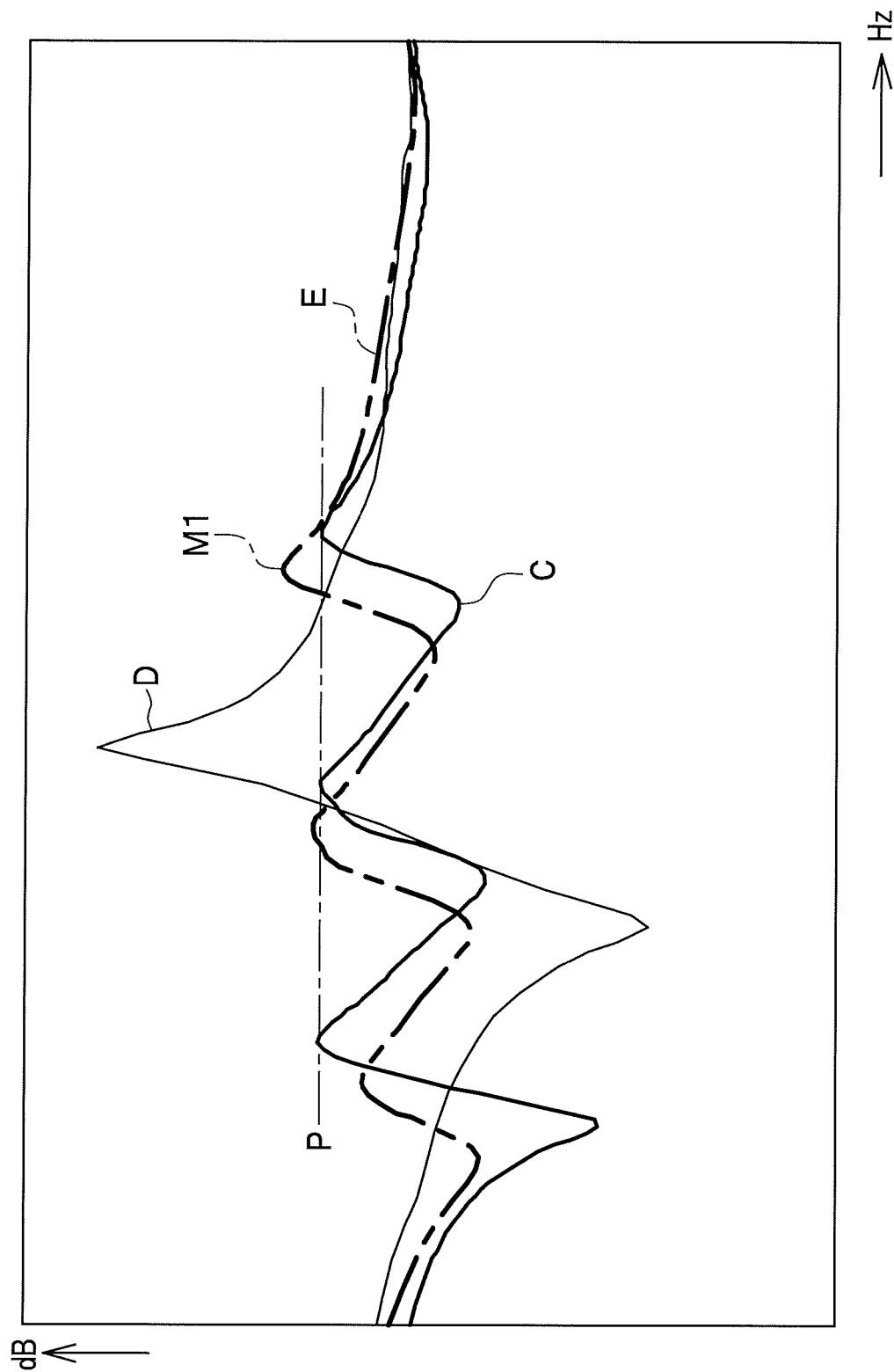
FIG. 8 is a chart showing comparison in noise reduction performance between the embodiment of the present invention and a comparative example 1.

FIG. 8 is a chart showing comparison in noise reduction performance between the embodiment of the present invention and a comparative example 1.

In FIG. 8, a thin solid line D indicates a characteristic curve in the case of no Helmholtz resonator in the wheel. A thick chain line E indicates a characteristic curve (Δfb/Δfa< (2.0 to 2.6)) of the comparative example 1 in which a ratio of a shift quantity Δfb of the upper limit frequency and a shift quantity Δfa of the lower limit frequency is set to be lower than from 2.0 to 2.6.

As shown by the thick chain line E in FIG. 8, the comparative example 1 is the same as the embodiment in that the rebound resonance has three peak portions. However, in the comparative example 1, the peak levels of the three peak portions are different and uneven. For example, out of the three peak portions, the peak level of the peak portion gradually increases from the peak portion on the left side of the drawing to the peak portion M1 on the right side of the drawing via the center peak portion. As a result of comparison of the embodiment with the comparative example 1, in the comparative example 1, the peak levels at the rebound resonations are not balanced in which the peak level of the peak portion M1 on the right side of the drawing exceed the level of a chain line P according to the embodiment in which the peak levels of the three peak portions are equalized, which applies an acoustic load to the crew. Accordingly it is difficult to improve the noise reduction in the comparative example 1.

Comparative Example 2

Figure 9:
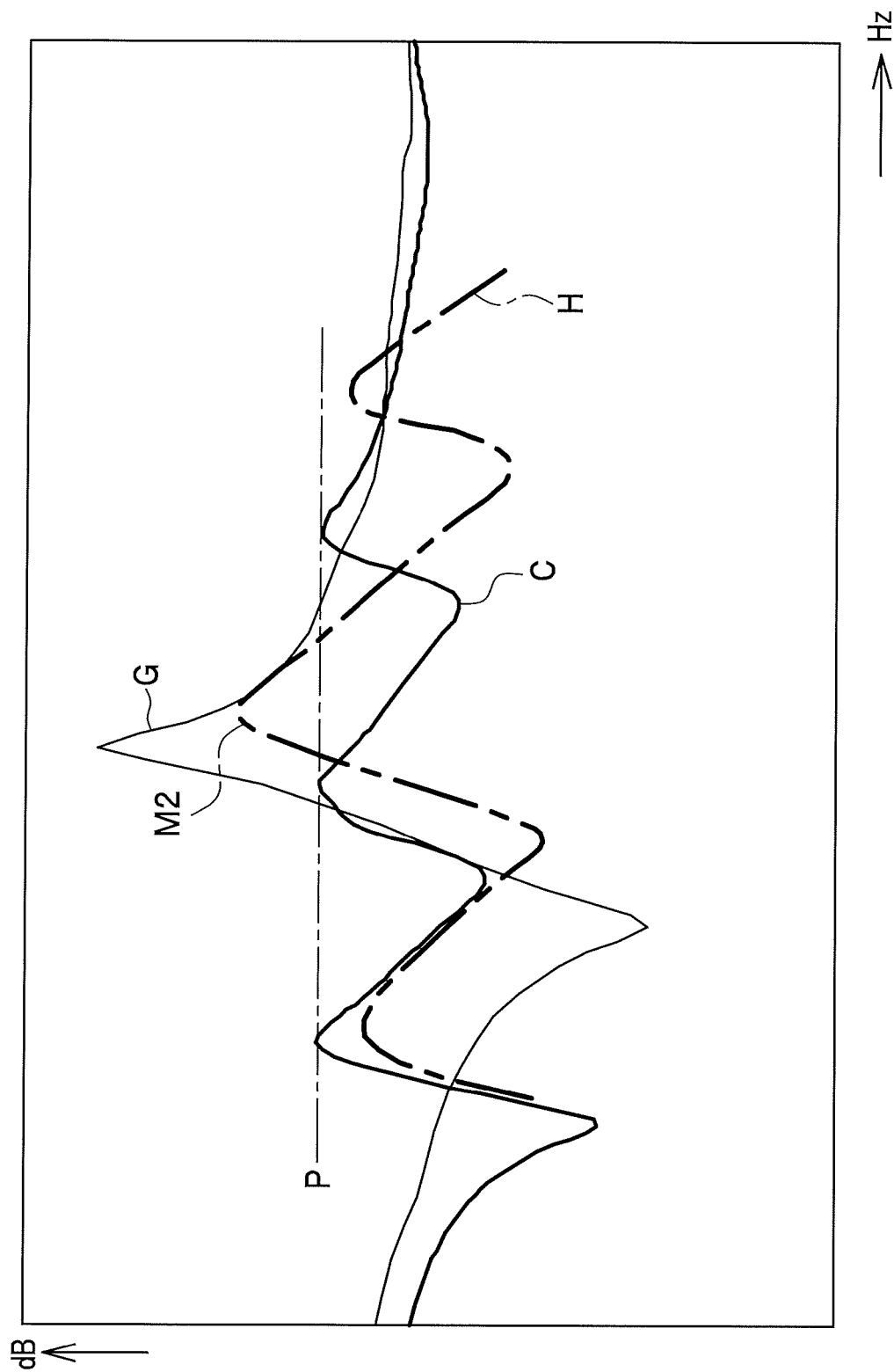
FIG. 9 is a chart showing comparative example 2 in noise reduction performance between the embodiment of the present invention and a comparative example 2.

FIG. 9 is a chart showing comparison in noise reduction performance between the embodiment of the present invention and a comparative example 2.

In FIG. 9, a thin solid line G indicates a characteristic curve in a case where there is no resonator in the wheel. A thick chain line H indicates a characteristic curve (Δfb/Δfa> (2.0 to 2.6)) set to the comparative example 2 in which a ratio of a shift quantity Δfb of the upper limit frequency and a shift quantity Δfa of the lower limit frequency is set to be larger than 2.0 to 2.6 (to escape from the range of 2.0 to 2.6). The thick solid line C indicates the characteristic curve of the vehicle wheel 1 according to the embodiment shown in FIG. 6.

As shown by the thick chain line H in FIG. 9, the comparative example 2 is same as the embodiment in that the rebound resonance has three peak portions. However, in the comparative example 2, the peak levels of the three peak portions are uneven because the peak level of the center peak portion M2 is higher than those of the peak portions on the left and right sides, i.e., highest. As a result of comparison of the embodiment with the comparative example 2, in the comparative example 2, the peak levels at the rebound resonances are not balanced in which the peak level of the center peak portion M2 exceeds the level of the chain line P according to the embodiment in which the peak levels of the three peak portions are equalized, which applies an acoustic load to the crew. Accordingly it is difficult to improve the noise reduction in the comparative example 2.

As the result, in the embodiment, the number of rebound resonance (peak portions) is increased from conventionally two to three and the peak levels of the three peak portions are substantially equalized and balanced. Accordingly, in the embodiment, the noise reduction performance has been enhanced relative to the comparative examples 1 and 2 by suppressing the peak level of the rebound resonance.

Figure 10:
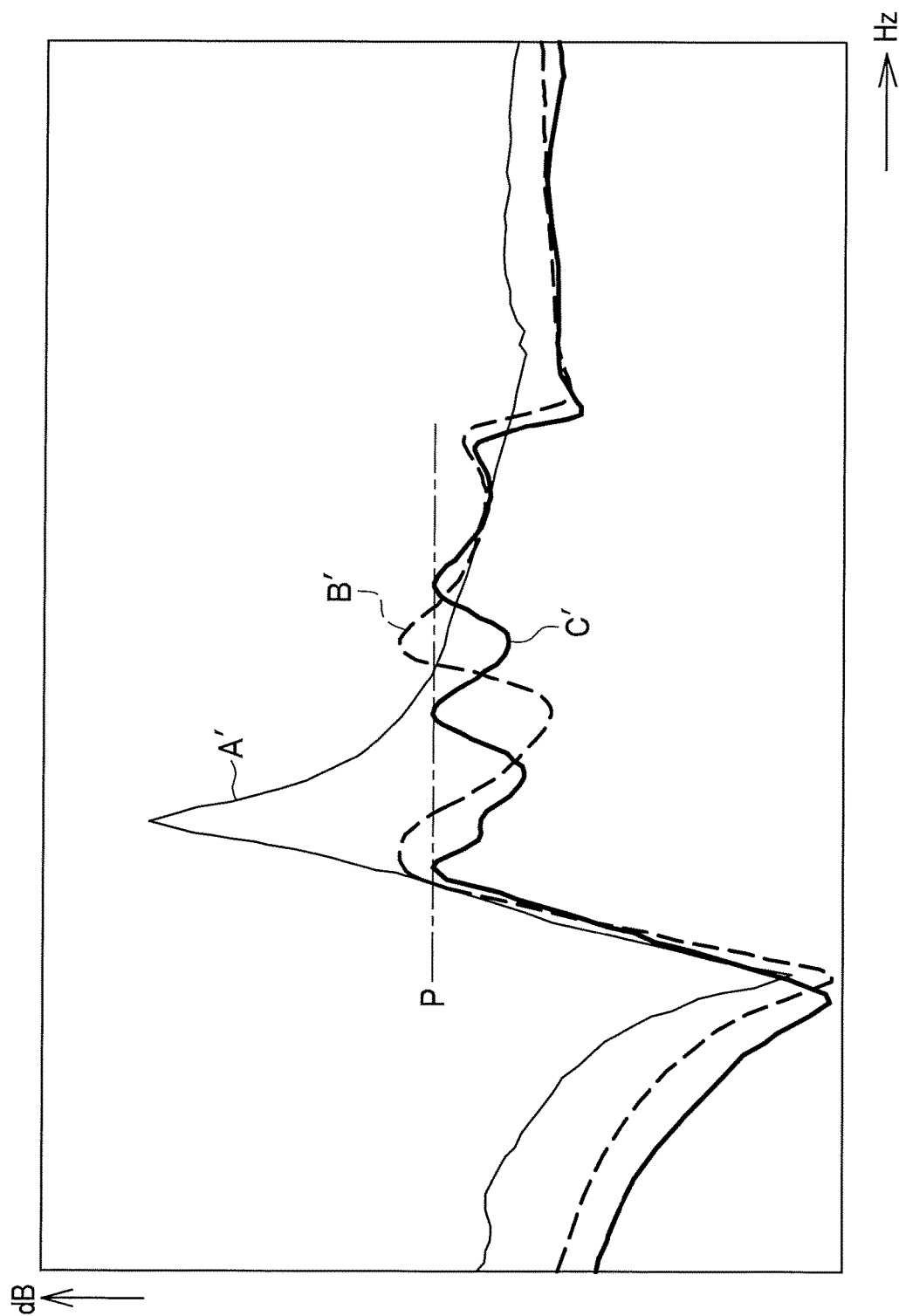
FIG. 10 is a chart showing the noise reduction performance according to another embodiment of the present invention.
Figure 11:
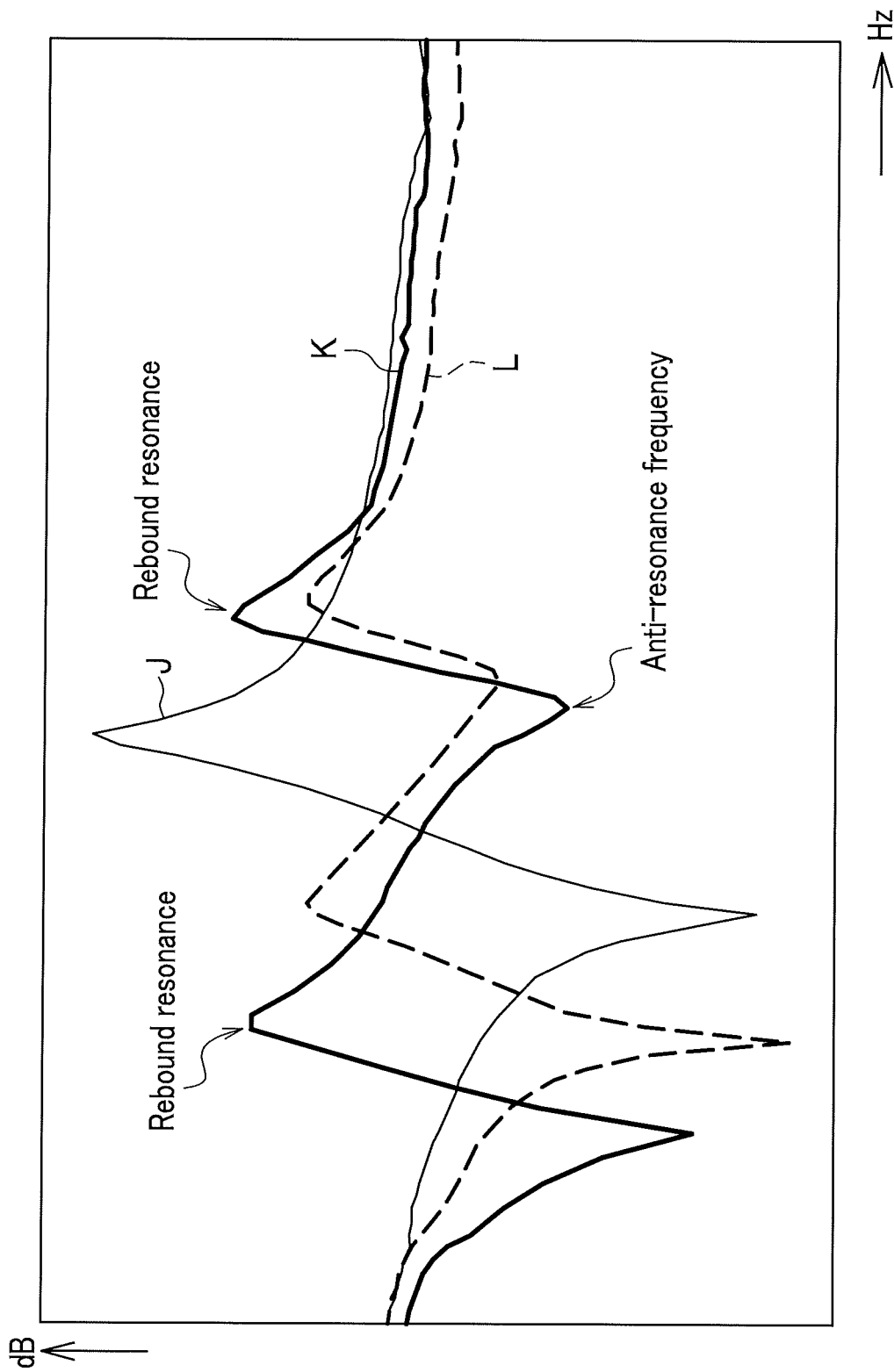
FIG. 11 is a chart showing a noise reduction performance according to related art.

FIG. 10 is a chart showing the noise reduction performance according to another embodiment of the present invention.

The vehicle wheel 1 according to another embodiment is different from the vehicle wheel 1 shown in FIG. 6 in that a volume of each of the four Helmholtz resonators including the additional air chamber member 10a, 10d (first Helmholtz resonator) and the additional air chamber members 10b, 10c (second Helmholtz resonators) is made smaller than that of the vehicle wheel 1 shown in FIG. 6.

In FIG. 10, a thin solid line A' indicates a variation in a case of no Helmholtz resonator in the wheel. A thick broken line B' indicates a variation in a case where all resonance frequencies f0 of the Helmholtz resonators disposed in the wheel are set to the same single frequency. A thick solid line C' indicates a variation in a case of the vehicle wheel 1 according to another embodiment.

As shown by the thick solid line C' in FIG. 10, in another embodiment, though the volumes of the Helmholtz resonators are made small, it is possible to substantially equalize the peak levels of the three peak portions and balance among them, so that the peak level of the rebound resonance can be suppressed and the noise reduction performance can be enhanced.

The technology according to the embodiment and another embodiment in which the resonance frequency f0 of the additional air chamber members 10a, 10d (first Helmholtz resonators) and the resonance frequency f0 of the additional air chamber members 10b, 10c (second Helmholtz resonators) are set, respectively, on the basis of the shift quantity (Δfa) of the lower limit frequency from the reference frequency of "0" and the shift quantity (Δfb) between the upper limit frequency from the reference frequency of "0" can be applied to various type of Helmholtz resonators because there is no influence from, for example, a noise reduction target, nose reduction phenomenon, noise reduction frequency, the structure of the Helmholtz resonators, a material of the Helmholtz resonators.

DESCRIPTION OF REFERENCE SYMBOLS 1 vehicle wheel
10 additional air chamber member
10a additional air chamber member (first Helmholtz resonator)
10b additional air chamber member (second Helmholtz resonator)
10c additional air chamber member 10c (second Helmholtz resonator)
10d additional air chamber member (first Helmholtz resonator)
18a communication through hole
Δfa first predetermined frequency
Δfb second predetermined frequency
SC additional air chamber
MC tire air chamber
Ax rotation center

The invention claimed is:

1. A vehicle wheel including: Helmholtz resonators including additional air chambers communicating with a tire air chamber through communication through holes, comprising:
two pairs of first Helmholtz resonators and second Helmholtz resonators, the first Helmholtz resonator being set to have noise reduction performance for a sound having a resonance frequency lower than the resonance frequency of an air column resonance sound in the tire chamber by a first predetermined frequency, the second Helmholtz resonator being set to have a noise reduction performance for a sound having a resonance frequency higher than the resonance frequency of the air column resonance sound by a second predetermined frequency,
wherein the communication through hole of the first Helmholtz resonator and the communication through hole of the second Helmholtz resonator are disposed at positions oppositely facing across a wheel rotation center, and
wherein a line connecting the communication through hole of the first Helmholtz resonator and the communication through hole of the second Helmholtz resonator of the one of pairs orthogonally intersects a line connecting the communication through hole of the first Helmholtz resonator and the communication through hole of the second Helmholtz resonator of the another one of pairs.

2. The vehicle wheel as claimed in claim 1,
wherein the first predetermined frequency is Δfa;
wherein the second predetermined frequency is Δfb, and
wherein when it is assumed that air column resonance sound in the tire air chamber is $f_{MC}$,
a resonance frequency $f_0$ of the first Helmholtz resonator is set to $f_{MC}-\Delta fa$ [Hz], where Δfa is a positive number from 1 to 10 and a resonance frequency f0 of the second Helmholtz resonator is set to $f_{MC}+\Delta fb$ [Hz], where Δfb is a positive number from 5 to 20, and the Δfb is set to be larger than the Δfa (Δfa<Δfb).

* * * * *